(12) United States Patent
Resnick

(10) Patent No.: US 9,348,785 B2
(45) Date of Patent: *May 24, 2016

(54) FLEXIBLE AND EXPANDABLE MEMORY ARCHITECTURES

(71) Applicant: Micron Technology, Inc., Boise, ID (US)

(72) Inventor: David R. Resnick, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,028

(22) Filed: Feb. 17, 2014

(65) Prior Publication Data

US 2014/0164667 A1    Jun. 12, 2014

Related U.S. Application Data

(63) Continuation of application No. 12/186,357, filed on Aug. 5, 2008, now Pat. No. 8,656,082.

(51) Int. Cl.
*G06F 13/28* (2006.01)
*G06F 13/40* (2006.01)

(52) U.S. Cl.
CPC .......... *G06F 13/4022* (2013.01); *G06F 13/287* (2013.01)

(58) Field of Classification Search
CPC ............................ G06F 13/287; G06F 13/4022
USPC ......................................................... 711/101
See application file for complete search history.

(56) References Cited

U.S. PATENT DOCUMENTS

| | | | |
|---|---|---|---|
| 6,038,630 A | 3/2000 | Foster et al. | |
| 6,633,947 B1 | 10/2003 | Holman et al. | |
| 8,656,082 B2 | 2/2014 | Resnick | |
| 2004/0083338 A1 | 4/2004 | Moriwaki et al. | |
| 2004/0215622 A1 | 10/2004 | Dubnicki et al. | |
| 2005/0216648 A1 | 9/2005 | Jeddeloh | |
| 2006/0277355 A1 | 12/2006 | Ellsberry et al. | |

(Continued)

FOREIGN PATENT DOCUMENTS

| | | |
|---|---|---|
| JP | 10500790 A | 1/1998 |
| JP | 2007520826 A | 7/2007 |

(Continued)

OTHER PUBLICATIONS

"Chinese Application Serial No. 200980134760.9, Response filed Apr. 24, 2014 to Office Action mailed Feb. 11, 2014", w/English Claims, 15 pgs.

(Continued)

*Primary Examiner* — Yong Choe
(74) *Attorney, Agent, or Firm* — Schwegman Lundberg & Woessner, P.A.

(57) ABSTRACT

Memory system architectures, memory modules, processing systems and methods are disclosed. In various embodiments, a memory system architecture includes a source configured to communicate signals to a memory device. At least one memory cube may coupled to the source by a communications link having more than one communications path. The memory cube may include a memory device operably coupled to a routing switch that selectively communicates the signals between the source and the memory device.

23 Claims, 14 Drawing Sheets

(56) References Cited

U.S. PATENT DOCUMENTS

| | | | |
|---|---|---|---|
| 2007/0011578 | A1 | 1/2007 | Lewis et al. |
| 2007/0136537 | A1 | 6/2007 | Doblar et al. |
| 2008/0099753 | A1* | 5/2008 | Song et al. .................. 257/2 |
| 2009/0172213 | A1* | 7/2009 | Jayachandran et al. ........ 710/19 |
| 2010/0036994 | A1 | 2/2010 | Resnick |

FOREIGN PATENT DOCUMENTS

| | | | |
|---|---|---|---|
| JP | 2008171432 | A | 7/2008 |
| JP | 2008537265 | A | 9/2008 |
| WO | WO-2010016889 | A2 | 2/2010 |
| WO | WO-2010016889 | A3 | 5/2010 |

OTHER PUBLICATIONS

"Japanese Application Serial No. 2011-522055, Examiners Decision of Final Refusal mailed May 7, 2014", w/English Translation, 5 pgs.
"Chinese Application Serial No. 200980134760.9, Office Action mailed Feb. 11, 2014", w/English Translation, 8 pgs.
"European Application Serial No. 09805259.0, Extended Search Report mailed May 25, 2012", 4 pgs.
"European Application Serial No. 09805259.0, Office Action mailed Feb. 7, 2013", 2 pgs.
"European Application Serial No. 09805259.0, Response filed Mar. 14, 2013 to Office Action mailed Feb. 7, 2013", 1 pg.
"European Application Serial No. 09805259.0, Response filed Nov. 7, 2012 to Extended Search Report mailed May 25, 2012", 16 pgs.
"International Application Serial No. PCT/US2009/004461, Search Report mailed Mar. 15, 2010", 5 pgs.
"International Application Serial No. PCT/US2009/004461, Written Opinion mailed Mar. 15, 2010", 4 pgs.
"Japanese Application Serial No. [Pending], Amendment filed Oct. 7, 2014", 8 pgs.
"Japanese Application serial No. 2011-522055, Office Action Mailed Dec. 2, 2014", W/ Machine Translation, (Dec. 2, 2014), 3 pgs.
"Taiwanese Application Serial No. 098126414, Office Action mailed Sep. 22, 2014", W/ English Translation, 22 pgs.
"Korean Application Serial No. 10-2011-7005191 Response filed Jun. 1, 2015 to Office Action mailed Mar. 2, 2015", With the English claims, 27 pgs.

* cited by examiner

FLEXIBLE AND EXPANDABLE MEMORY ARCHITECTURES

PRIORITY APPLICATION

This application is a continuation of U.S. application Ser. No. 12/186,357, filed Aug. 5, 2008, which is incorporated herein by reference in its entirety.

BACKGROUND

Continuing advances in computer technology have introduced numerous improvements in the performance of various components, including processors and memory devices. Since the various components in computer systems are generally communicatively coupled, communication speeds and bandwidth requirements constitute significant challenges, which are exacerbated by steadily increasing processing speeds and bandwidth requirements. Accordingly, improvements in computer systems that are directed to enhanced communications between processors and memory devices remain an urgent requirement.

BRIEF DESCRIPTION OF THE DRAWINGS

Various embodiments are described in detail in the discussion below and with reference to the following drawings.

DETAILED DESCRIPTION

Various embodiments include memory systems, modules, processing systems and methods. Specific details of several embodiments are set forth in the following description and in FIGS. 1 through 15 to provide an understanding of such embodiments. One of ordinary skill in the art, however, will understand that additional embodiments are possible, and that many embodiments may be practiced without several of the details disclosed in the following description. It is also understood that various embodiments may be implemented within a physical circuit that includes physical components (e.g., "hardware"), or they may be implemented using machine-readable instructions (e.g., "software"), or in some combination of physical components and machine readable instructions (e.g., "firmware").

Figure 1:
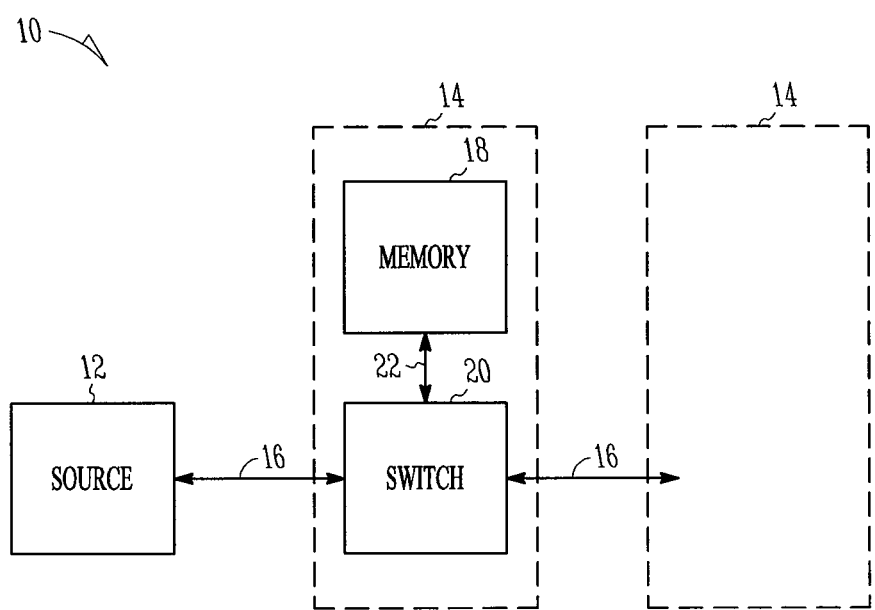
FIG. 1 is a diagrammatic block view of a memory system, according to various embodiments.

FIG. 1 is a diagrammatic block view of a memory system 10, according to one or more of the embodiments. The memory system 10 may include a source 12 that is operable to communicate data to one or more memory cubes 14 through a communications link 16. The memory cubes 14 include memory devices. The source 12 may include, for example, a memory controller portion of a larger processing system (not shown in FIG. 1) that includes circuitry that manages the flow of information to and from memory devices coupled to the memory controller. For example, circuitry within the memory controller may be operable to perform various memory device-related tasks, such as memory device refresh, address encoding and decoding, data transfer, or other known memory related tasks. The source 12 may be coupled to the one or more of the memory cubes 14 by a communications link 16.

The communication link 16 generally includes two or more individual interconnecting and individually bidirectional communications paths (not shown in FIG. 1), which may be implemented using serial and/or parallel communications paths. For example, the paths may include differential signal arrangements, or alternatively, single ended signal arrangements may also be used, or a combination of single ended and differential signal pairs may be used in the paths. In the various embodiments, the communications link 16 may include two communications paths extending between the source 12 and a single memory cube 14, so that the bandwidth in the communications link 16 is approximately twice that achievable using a single communication path. Alternatively, a selected one of the communications paths may be used as a redundant communications path, or to provide a pass-on capability, wherein data may be communicated between the source 12 and to other memory cubes 14 in a coupled chain of the memory cubes 14. In various embodiments, the communications link 16 may include four communications paths, which provide increases in bandwidth, when compared to two communications paths. As an alternative, the four communications paths may be employed to provide redundant communications paths, and/or to communicate with other memory cubes 14 in a variety of arrangements, as will be described in detail below. In various embodiments, the communications paths include 16 lanes in each direction, full duplex, so that a total of 32 lanes are present in each communications path. Additionally, in the various embodiments, a pair of narrower communications paths may be optimized to provide better performance than a single, wider communications path. Although not shown in FIG. 1, additional communications paths, such as a multi-drop bus may couple the source 12 to other memory devices, or may be used to communicate clocking signals, power, or other additional control signals to the other memory devices.

The memory cubes 14 include a memory unit 18 that is operably coupled to a routing switch 20 by a local link 22. The routing switch 20, is, in turn, coupled to the communications link 16. The communications link 16 may include multiple communications paths. For example, the local link 22 may include four or more bidirectional communications paths, although fewer than four communications paths may be present in the local link 22. The memory unit 18 may include one or more discrete memory devices, such as a static memory, a dynamic random access memory (DRAM), an extended data out dynamic random access memory (EDO DRAM), a synchronous dynamic random access memory (SDRAM), a double data rate synchronous dynamic random access memory (DDR SDRAM), a double data rate two synchronous dynamic random access memory (DDR2 SDRAM), a double data rate three synchronous dynamic random access memory (DDR3 SDRAM), a synchronous link dynamic random access memory (SLDRAM), a video random access memory (VRAM), a RAMBUS dynamic random access memory (RDRAM), a static random access memory (SRAM), a flash memory, as well as other known memory devices.

Still referring to FIG. 1, the routing switch 20 is generally operable to selectively communicate signals to and from the memory unit 18 and also to communicate signals along the communications link 16. Accordingly, the routing switch 20 may further include various circuits that are configured to perform packet assembly and disassembly, packet error checking, signal multiplexing, buffering, as well as other prescribed functions. The routing switch 20 will be described in greater detail below.

The memory system 10 may be implemented using a common and generally removable circuit assembly that may be coupled to a larger electronic system by edge connectors, removable plug assemblies, or other known removable interconnection devices. Additionally, the memory system 10 may be implemented as an integrated component within the routing switch 20. Alternatively, the memory system 10 may be implemented as a fabricated portion of a larger electronic system.

Figure 2:
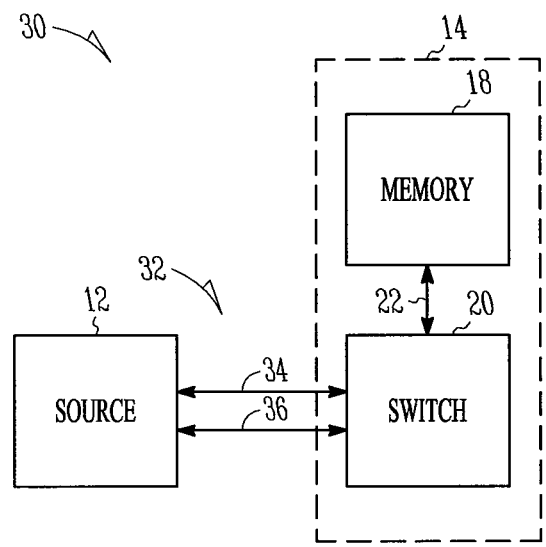
FIG. 2 is a diagrammatic block view of a memory system, according to various embodiments.
Figure 3:
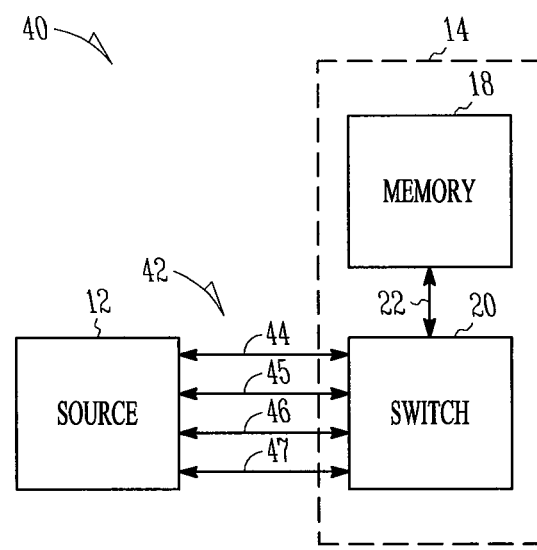
FIG. 3 is a diagrammatic block view of a memory system, according to various embodiments.

With reference now to FIG. 2 and to FIG. 3, diagrammatic views of memory systems 30 and 40, respectively, are shown according to various embodiments. The memory system 30 includes a communications link 32 that includes a first communications path 34 and a second communications path 36 that are suitably configured to couple the source 12 to the memory cube 14. The communications link 32 therefore allows increased bandwidth communications between the source 12 and the memory cube 14. Alternatively, in other particular embodiments, a selected one of the first communications path 34 and the second communications path 36 may be configured to provide a redundant communications path, so that data may be communicated between the source 12 and the memory cube 14 in the event that one of the first communications path 34 and the second communications path 36 fails. In still other embodiments, one of the first communications path 34 and the second communications path 36 may be configured to communicate with selected banks in the memory unit 18. For example, if the memory unit 18 includes 32 memory banks, then the first communications path 34 may be used to reference 16 of the banks, while the second communications path 36 may be used to reference the remaining 16 memory banks. In other embodiments, one of the first communications path 34 and the second communications path 36 may communicate with still another memory cube 14 (not shown in FIG. 3) so that a pass-on communications path is provided.

The memory system 40 in FIG. 3 includes a communications link 42 that includes a first communications path 44, a second communications path 45, a third communications path 46, and a fourth communications path 47. The first communications path 44 through the fourth communications path 47 are also configured to couple the source 12 to the memory cube 14, so that increased bandwidth communications between the source 12 and the memory cube 14 may be achieved. In other embodiments, a selected pair of the first communications path 44, the second communications path 45, the third communications path 46 and the fourth communications path 47 may be configured to communicate with the memory cube 14, while another selected pair provide communications paths to other memory cubes 14 (not shown in FIG. 3). In still other embodiments, each of the communications paths 44 through 47 may be coupled to separate memory cubes 14 or separate groups of serially-coupled memory cubes 14.

Figure 3A:
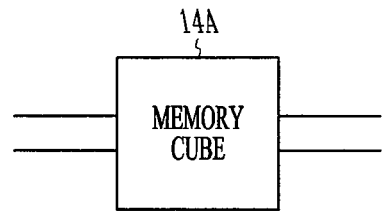
FIG. 3A is a diagrammatic block view of a memory cube, according to the various embodiments.
Figure 3B:
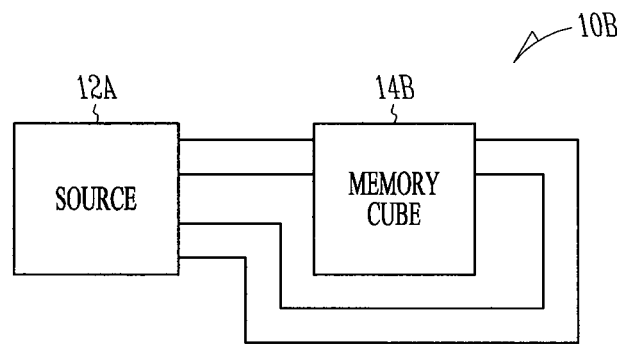
FIG. 3B is a diagrammatic block view of a memory system according to the various embodiments.
Figure 3C:
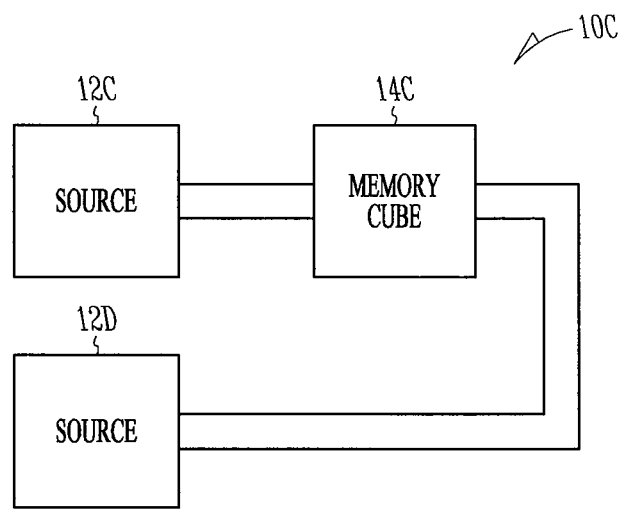
FIG. 3C is a diagrammatic block view of a memory system according to the various embodiments.
Figure 3D:
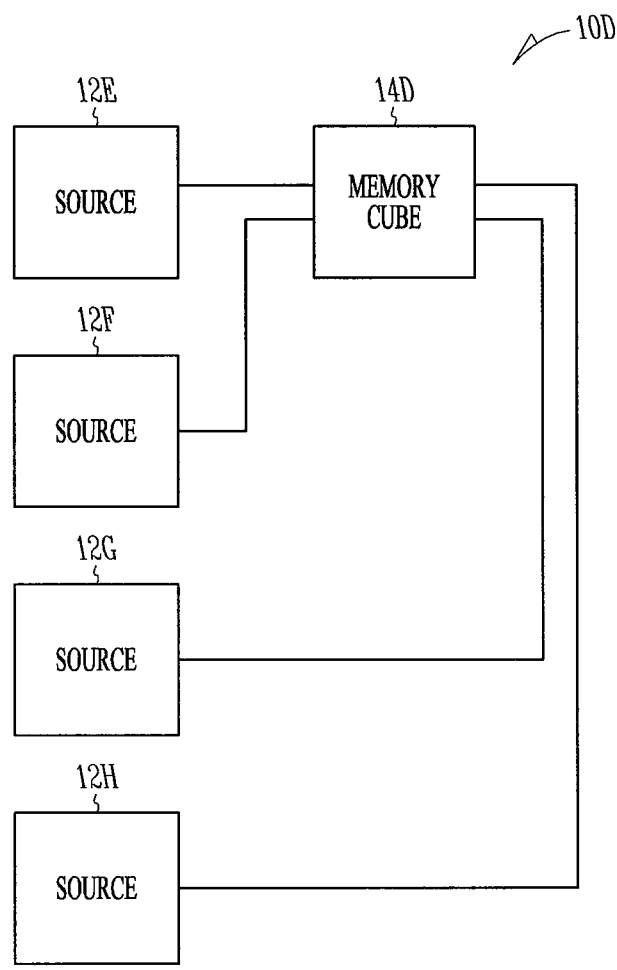
FIG. 3D is a diagrammatic block view of a memory system according to the various embodiments.

FIGS. 3A through 3D are diagrammatic block views of various memory implementations according to the various embodiments. FIG. 3A is a diagrammatic block view of a memory cube 14a, which may be selectively coupled to other sources through communications paths coupled to the memory cube 14a, as will be described. FIG. 3B is a diagrammatic block view of a memory system 10b, where a memory cube 14b is operably coupled to a source 12a, wherein the communications paths extending from the memory cube 14b are directed back to the source 12a. FIG. 3C is a diagrammatic block view of a memory system 10c, where a memory cube 14b is operably coupled to a first source 12c and a second source 12d, where the communications paths extending from the memory cube 14c are directed back to the first source 12c and the second source 12d. FIG. 3D is a diagrammatic block view of a memory system 10d, where a memory cube 14d is operably coupled to a plurality of sources 12e through 12h. In the memory system 10d, the communications paths extending from the memory cube 14d are directed back to the sources 12e through 12h.

Figure 4:
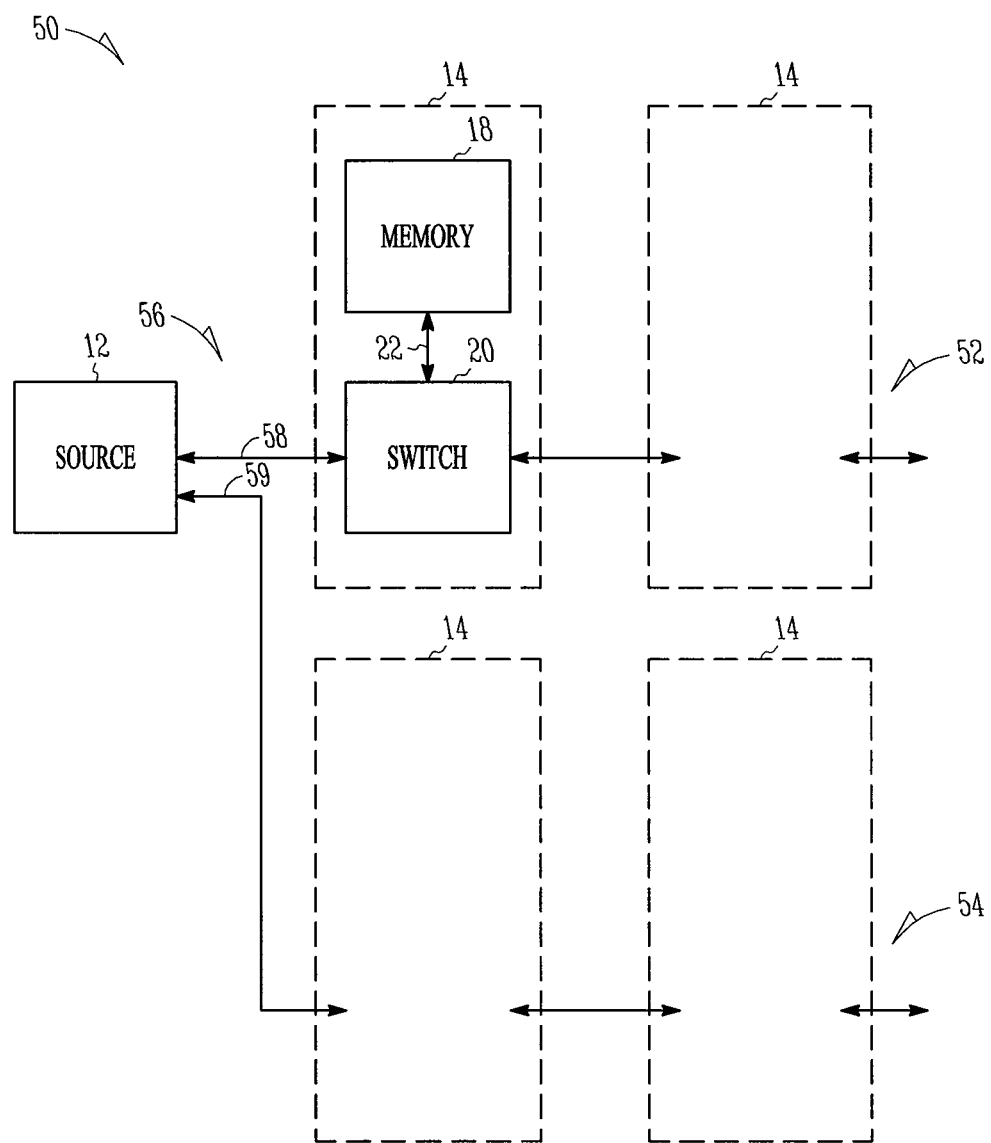
FIG. 4 is a diagrammatic block view of a memory system, according to various embodiments.

FIG. 4 is a diagrammatic block view of a memory system 50, according to another of the various embodiments. The memory system 50 may include a first group 52 having one or more of the memory cubes 14 and a second group 54 having one or more of the memory cubes 14. The first group 52 and the second group 54 may be communicatively coupled to the source 12 by a communications link 56 that includes a first communications path 58 that is operably coupled to the first group 52, and a second communications path 59 that is operably coupled to the first group 52. In various embodiments, the first group 52 and the second group 54 may include up to eight memory cubes 14. In various embodiments, the first group 52 and the second group 54 may include more than, or fewer than eight memory cubes 14. In various embodiments, some of the memory cubes 14 may be serially coupled, where advanced error correction methods that are configured to accommodate a memory device failure, such as CHIPKILL or CHIPSPARE, are employed. Briefly, and in general terms, such advanced error correction methods protect memory systems from a single memory device failure, or from multi-bit errors from a single memory device by providing at least one additional memory device that functionally replaces the failed memory device. Accordingly, the memory contents of the failed memory device may be preserved and/or reconstructed.

Figure 5:
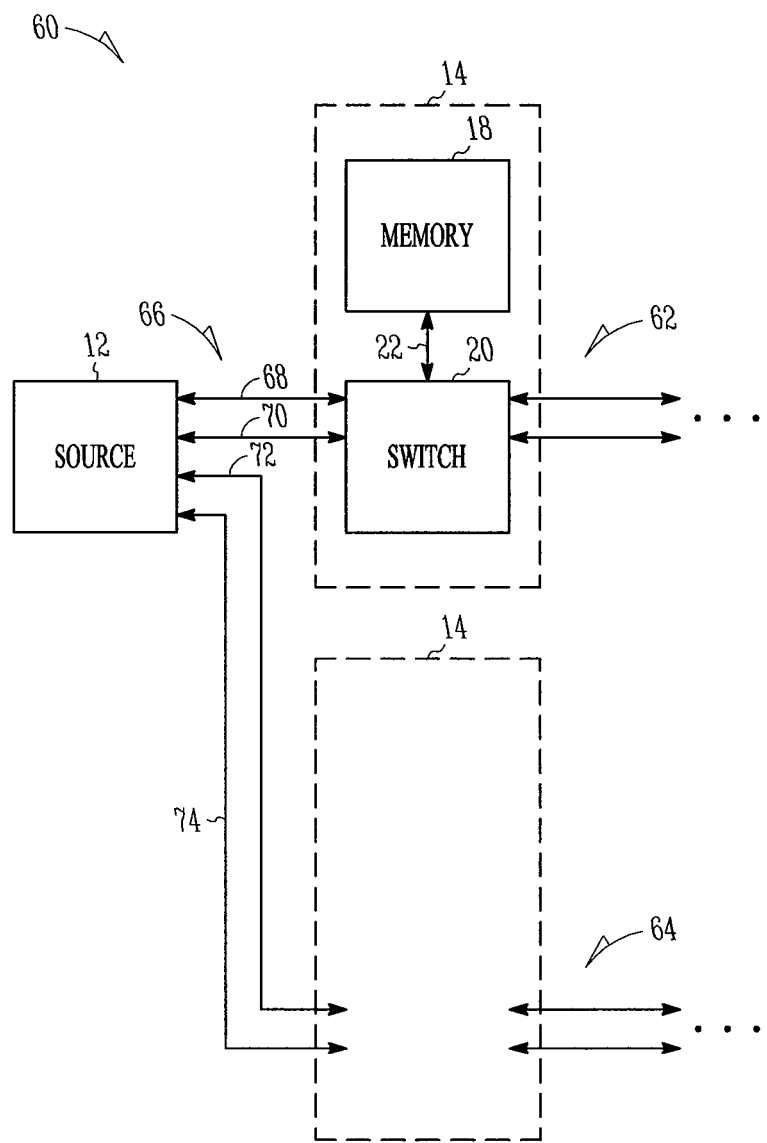
FIG. 5 is a diagrammatic block view of a memory system, according to various embodiments.

FIG. 5 is a diagrammatic block view of a memory system 60, according to various embodiments. The memory system 60 may include a first group 62 that includes one or more of the memory cubes 14 and a second group 64, also including one or more of the memory cubes 14. The first group 62 and the second group 64 may be communicatively coupled to the source 12 by a communications link 66 that includes a first communications path 68 and a second communications path 70 that are operably coupled to the first group 62. The memory system 60 may also include a third communications path 72 and a fourth communications path 74 operably coupled to the second group 64. As discussed previously, the first communications path 68 and the second communications path 70 may impart increased bandwidth communications between the source 12 and the first group 62, and/or provide a pass-on capability to other memory cubes 14 in the first group 62, while the third communications path 72 and the fourth communications path 74 may likewise impart increased bandwidth communications between the source 12 and the second group 64, and may also be used provide a pass-on capability to other memory cubes 14 that may be present in the second group 64.

Figure 6:
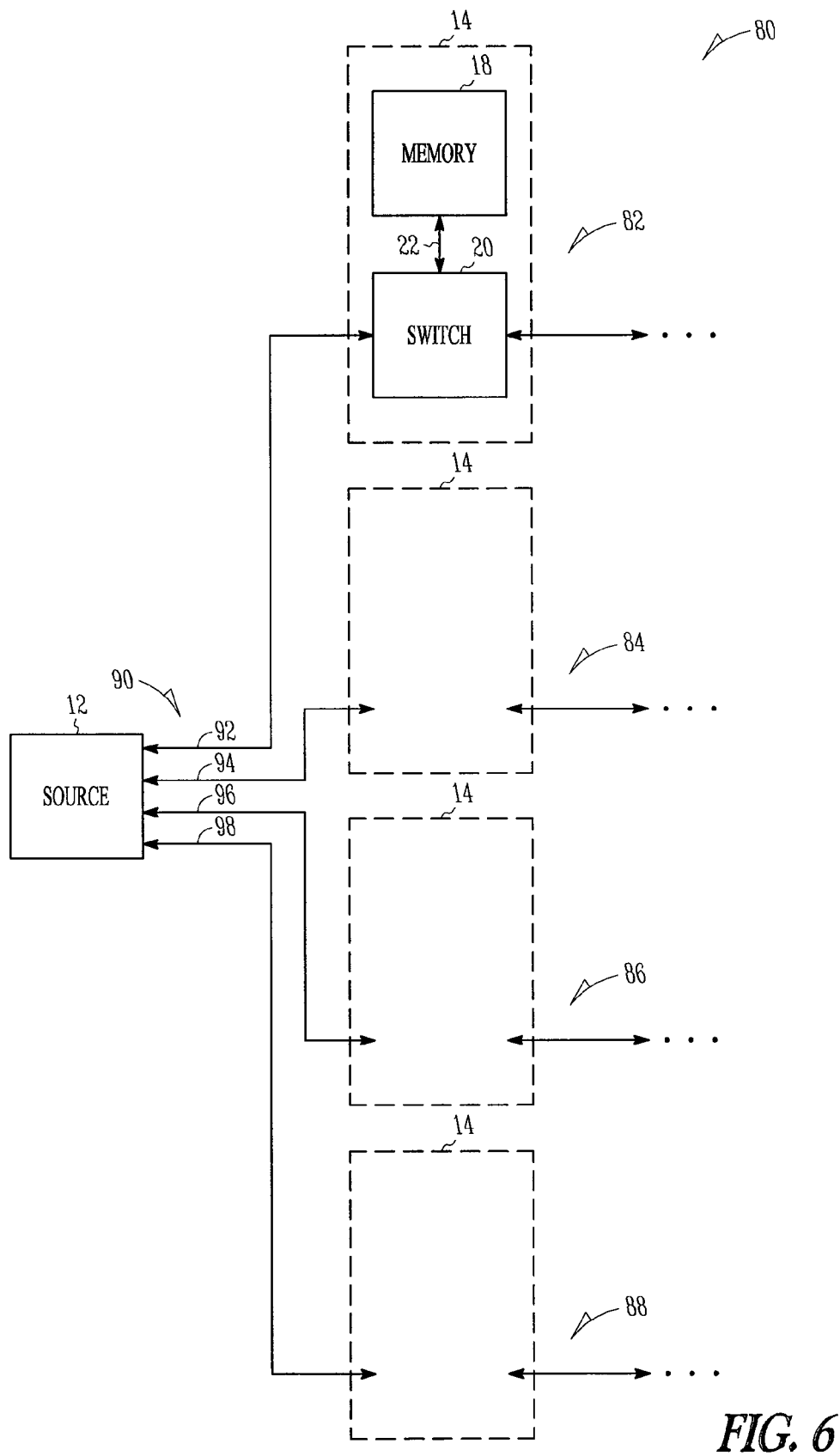
FIG. 6 is a diagrammatic block view of a memory system, according to various embodiments.

FIG. 6 is a diagrammatic block view of a memory system 80, according to various embodiments. The memory system 80 may include a first group 82 a second group 84, a third group 86 and a fourth group 88, which may each include one or more of the memory cubes 14. A communications link 90 communicatively couples the first group 82, the second group 84, the third group 86 and the fourth group 88 to the source 12. Accordingly, the communications link 90 may include a first communications path 92 coupled to the first group 82, a second communications path 94 coupled to the second group 84, a third communications path 96 coupled to the third group 86, and a fourth communications path 98 coupled to the fourth group 88. Since the communications link 90 couples the first group 82, the second group 84, the third group 86 and the fourth group 88 to the source 12, greater numbers of the memory cubes 14 may be provided.

Figure 7:
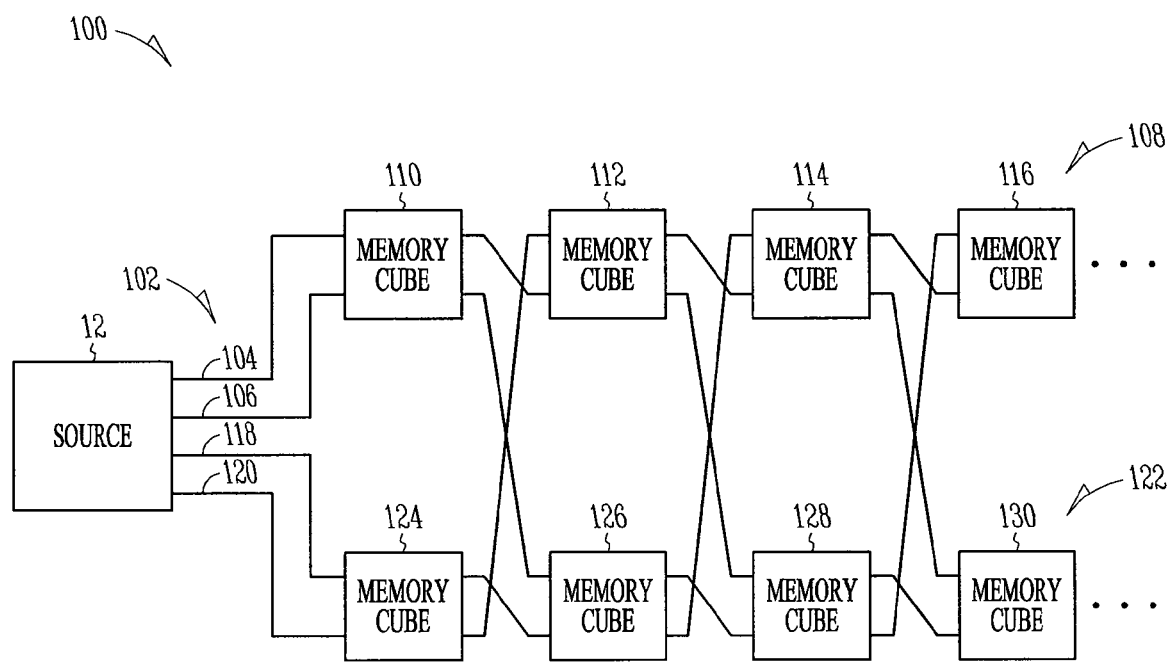
FIG. 7 is diagrammatic block view of a memory system, according to the various embodiments.

FIG. 7 is diagrammatic block view of a memory system 100, according to various embodiments. The memory system 100 includes a communications link 102 that may include a first communications path 104 and a second communications path 106 that are coupled to a first group 108 of memory cubes, that in the present illustrated embodiment, may include a memory cube 110 through a memory cube 116, although more of the memory cubes, or even fewer of the illustrated memory cubes may be included in the first group 108. The communications link 102 also includes a third communications path 118 and a fourth communications path 120 that are coupled to a second group 122 of memory cubes, which may include a memory cube 110 through a memory cube 116, although more of the memory cubes, or even fewer of the memory cubes may be included in the second group 122. A selected one of the first communications path 104 and the second communications path 106 are suitably configured to be coupled to the memory cubes in the second group 122, while a selected one of the third communications path 118 and the fourth communications path 120 may be configured to be coupled to the memory cubes in the first group 108. Accordingly, the first group 108 and the second group 122 are coupled in an intertwined manner to provide redundant communications paths that may be used in case one or more of the memory cubes 110 through 116 in the first group 108 and/or one or more of the memory cubes 124 through 130 in the second group 122 fails. Specifically, if one or more of the memory cubes 110 through 116 in the first group 108 fails, the first group 108 may employ one or more of the memory cubes 124 through 130 in the second group 122 for access to other memory cubes in the first group 108 that are positioned down the path relative to the source. Correspondingly, when one or more of the memory cubes 124 through 130 in the second group 122 fails, the second group 122 may employ one or more of the memory cubes 110 through 116 in the first group 108. For example, and with reference still to FIG. 7, if the memory cube 112 fails, data proceeding outwardly from the source 12 may be routed from memory cube 110 in the first group 108 to the memory cube 126 in the second group 122. Data proceeding outwardly from the memory cube 126 may then be routed to the memory cube 114 in the first group 108.

With reference still to FIG. 7, a defective one of the memory cubes 110 through 116 and 124 through 130 may be identified by counting a number of negative-acknowledge characters (NAK) returned by a receiver positioned in each of the routing switches 20 (as shown in FIG. 1) in each of the memory cubes 110 through 116 and the memory cubes 124 through 130. Upon encountering a specified number of NAKs, the defective one of the memory cubes 110 through 116 and 124 through 130 may be selectively bypassed, as discussed above. Alternatively, a transmitter positioned in each of the routing switches 20 (as again shown in FIG. 1) in each of the memory cubes 110 through 116 and the memory cubes 124 through 130 may be configured to indicate that a failure in a memory cube has occurred when a data transmission time has been exceeded, which may correspond to a number retransmission attempts. Again, the memory cube identified as defective may be selectively bypassed in response to the detected error.

Figure 8:
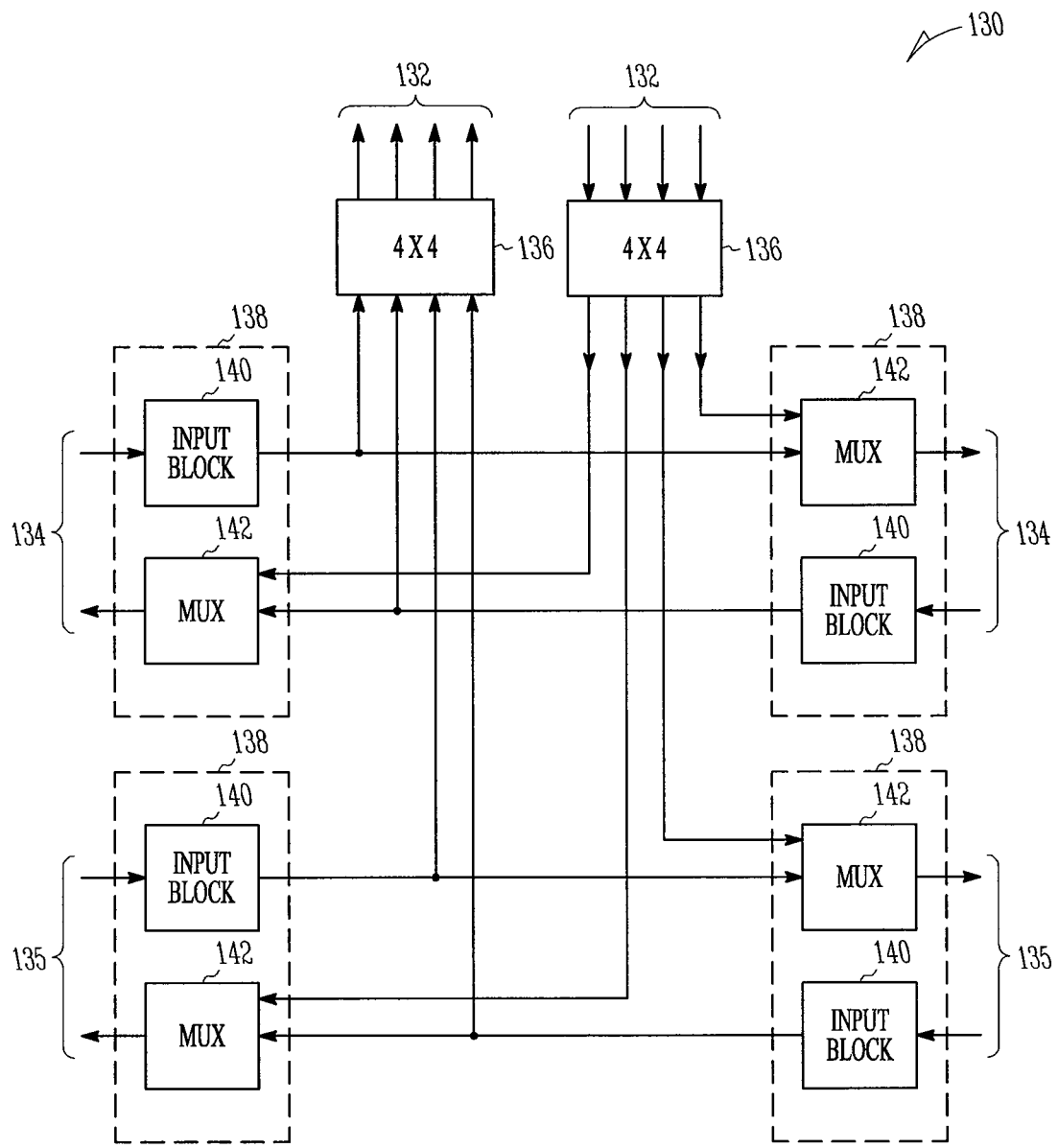
FIG. 8 is a partial schematic view of a routing switch for a memory system, according to various embodiments.

With reference now to FIG. 8, a diagrammatic block view of a routing switch 130 according to various embodiments is shown. The routing switch 130 may be included in the memory cubes, as earlier described in connection with the various embodiments. The routing switch 130 may be configured to communicate with local memory (e.g., the memory unit 18 shown in FIG. 1) through a plurality of local paths 132 extending between the local memory and the routing switch 130. The routing switch 130 may be coupled to the local paths 132 through cross point switching networks 136. Although not shown in FIG. 8, it is understood that the cross point switching networks 136 may also include suitable logic and buffering circuits. The routing switch 130 also includes bidirectional input/output (I/O) ports 138 that are selectively coupleable to a first communications path 134 and a second communications path 135. The I/O ports 138 are suitably interconnected with the cross point switching networks 136 to cooperatively form paths from the first communications path 134 and the second communications path 135 to the memory device through the local paths 132. The first communications path 134 and the second communications path 135 may also form pass-on paths through the routing switch 130, so that data may be communicated to other memory cubes 14 (not shown in FIG. 8). Each of the I/O ports 138 may include input blocks 140 that are configured to receive packetized data communicated to the routing switch 130 from a source (e.g., the source 12 of FIG. 1) and from other memory cubes 14 (shown in FIG. 1). The input blocks 140 may therefore include suitable data receivers, data drivers, buffers, packet assembly and disassembly circuits and error checking circuits. For example, the input block 140 may include Error Correcting Code (ECC) circuitry configured to correct single or multi-bit failures that may occur during data communication. The I/O ports 138 may also include multiplexing units (MUX) 142 generally operable to receive multiple signals applied to an input of the MUX 142, and to provide a selected one of the multiple signals at an output of the MUX 142, in response to an applied control signal.

Figure 9:
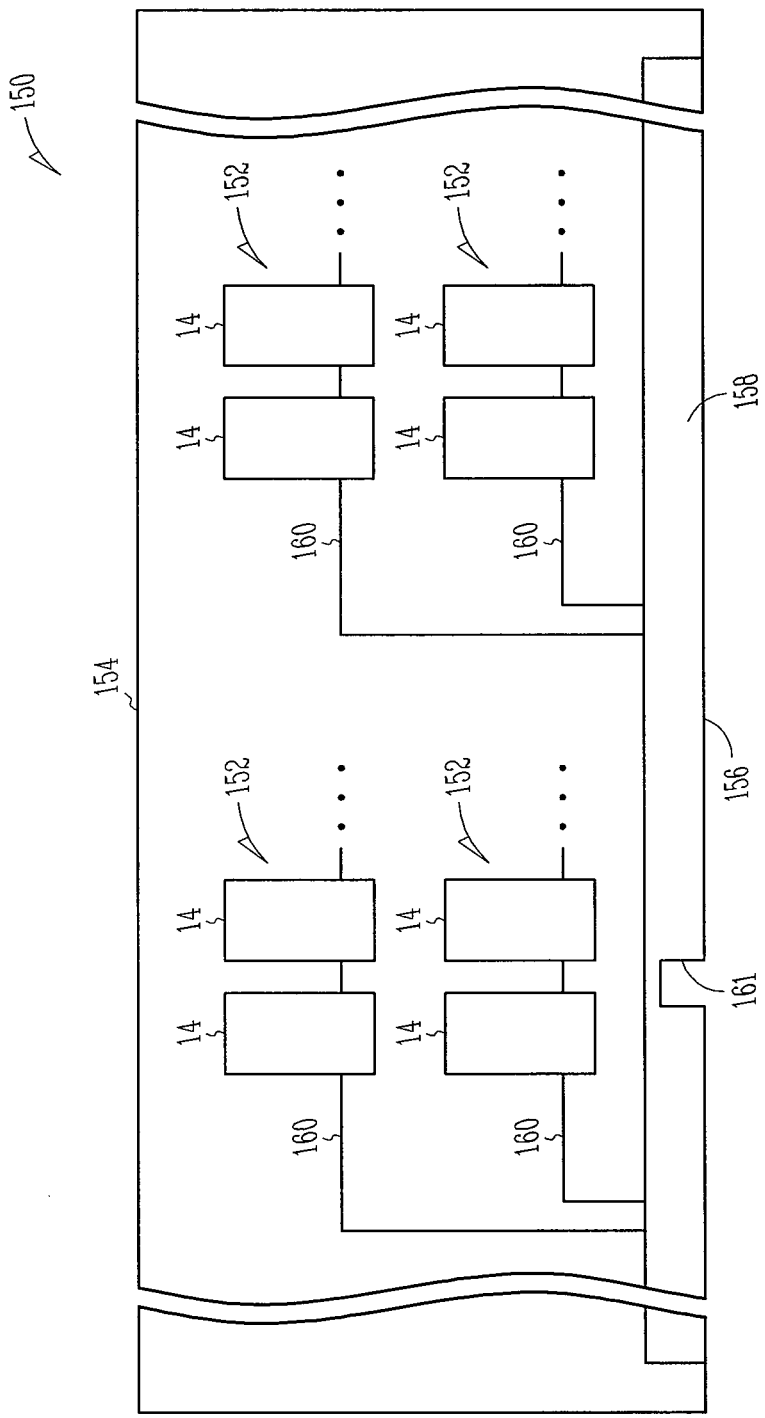
FIG. 9 is a partial diagrammatic block view of a memory module, according to various embodiments.

FIG. 9 is a partial schematic view of a memory module 150 according to various embodiments. The memory module 150 includes at least one group 152 of memory cubes 14 positioned on a substrate 154. The substrate 154 may include a generally planar dielectric structure. The substrate 154 may accordingly include a front side and an opposing back side, and be suitably configured to support conductive traces that electrically couple various components positioned on the substrate 154 to an edge connector 156 positioned along a selected edge 158 of the substrate 154. Communications paths 160 may be disposed on the substrate 154 that extend between the edge connector 156 and the groups 152. Although not shown in FIG. 9, a selected subset of the communications paths 160 and the groups 152 may be disposed on a front side of the substrate 154, while the remaining communications paths 160 and groups 152 may be disposed on the back side of the substrate 154. Since the substrate 154 may also include discrete layers of conductors within the substrate 154, a portion, or even all of the communications paths 160 may be disposed within the substrate 154. The edge connector 156 may include generally spaced-apart electrical conductors (not shown in FIG. 9) that are configured to be received by mating contacts in a receiving edge connector slot (also not shown in FIG. 9) so that the module 150 may communicate with circuits and devices external to the module 150. The edge connector 156 may also be disposed on the front side and/or the rear side of the substrate 154, and may include one or more key slots 161 to permit proper alignment of the module 150 in the receiving edge connector slot. Although not shown in FIG. 9, it is understood that various other components may be positioned on the substrate 154, which may be coupled to other external circuits and devices by conductive traces that extend between the edge connector 156 and the various other devices. Edge connector 156 may include other electrical interconnection devices. For example, a pin connection structure may also be used, which is configured to receive a flexible network of conductors, such as a multi-conductor planar cable, or other similar structures.

Figure 10:
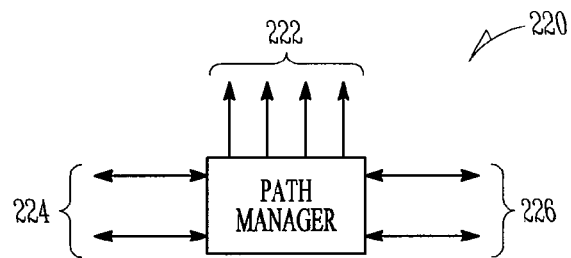
FIG. 10 is a partial diagrammatic block view of a path manager for a memory system, according to various embodiments.

With reference still to FIG. 9, in order to accommodate greater numbers of the groups 152, a router structure may be incorporated into the various embodiments. Such incorporations may promote enhancements such as increased system flexibility and the integration of greater numbers of the groups 152. Referring now also to FIG. 10, a diagrammatic block view of a path manager 220 is shown, according to various embodiments. The path manager 220 may be configured to support a plurality of local paths 222 that may be communicatively coupled in place of the source paths shown in the previous Figures. For example, the communications link 16 in FIG. 1 or the communications path 92 in FIG. 6 provide additional levels (e.g., 'fan out) so that additional cubes may be coupled. Although FIG. 10 illustrates four local paths 222, it is understood that fewer than four, or more than four of the local paths 222 may be present. The path manager 220 may also be configured to support global source paths 224, which may be coupled to a source operable to communicate data and instructions to and from the groups 152 coupled to the local paths 222, and to support global pass-on paths 226 that may also be coupled to other groups 152 in FIG. 9, in order to provide a pass-on capability. The path manager 220 may be implemented in an applications-specific integrated circuit (ASIC), or it may be implemented using a field programmable gate array (FPGA), or using other suitable logic technology.

Figure 11:
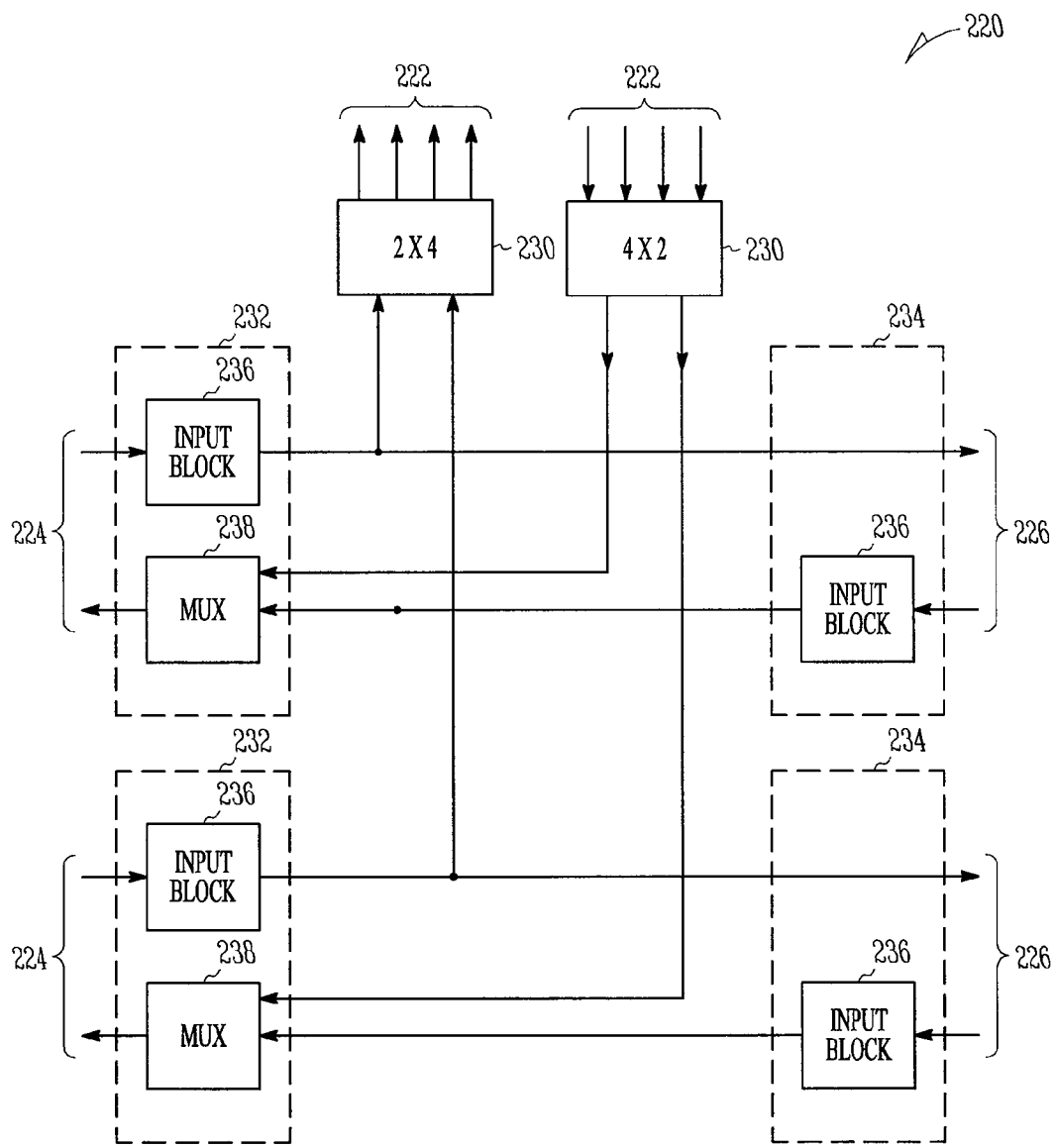
FIG. 11 is a partial diagrammatic block view of a path manager, according to various embodiments.

With reference still to FIG. 10, and now also to FIG. 11, various details of the path manager 220 according to various embodiments will be described. The path manager 220 may be configured to communicate with groups 152 of the memory cubes 14 (as shown in FIG. 9) through the local paths 222 extending between the groups 152 and the path manager 220. Cross point switching networks 230 couple the local paths 222 to the global source paths 224 and the global pass on paths 226. Although not shown in FIG. 11, other logic and buffering circuits may also be included in the cross point switching networks 230. The path manager 220 may also include bidirectional input/output (I/O) ports 232 that are coupleable to the global source paths 224, and bidirectional input/output (I/O) ports 234 that are coupleable to the global pass-on paths 226. The I/O ports 232 may include input blocks 236 that are configured to receive packetized data communicated to the path manager 220 along the global source paths 224. The input blocks 236 may include other devices not shown in FIG. 11, which may include data receivers, data drivers, buffers, packet assembly and disassembly circuits, error checking circuits, and other similar circuits. The I/O ports 232 may also include multiplexing units (MUX) 238 that are operable to receive multiple signals applied to an input of the MUX 238, and to provide a selected one of the multiple signals at an output of the MUX 238. The I/O ports 234 may also include the input blocks 236 to receive packetized data communicated to the path manager 220 along the global pass on paths 226. Although not shown in FIG. 11, the input blocks 236 may include other devices, data receivers, data drivers, buffers, packet assembly and disassembly circuits, error checking circuits, and other devices that generally assist packetized data communication.

Figure 12:
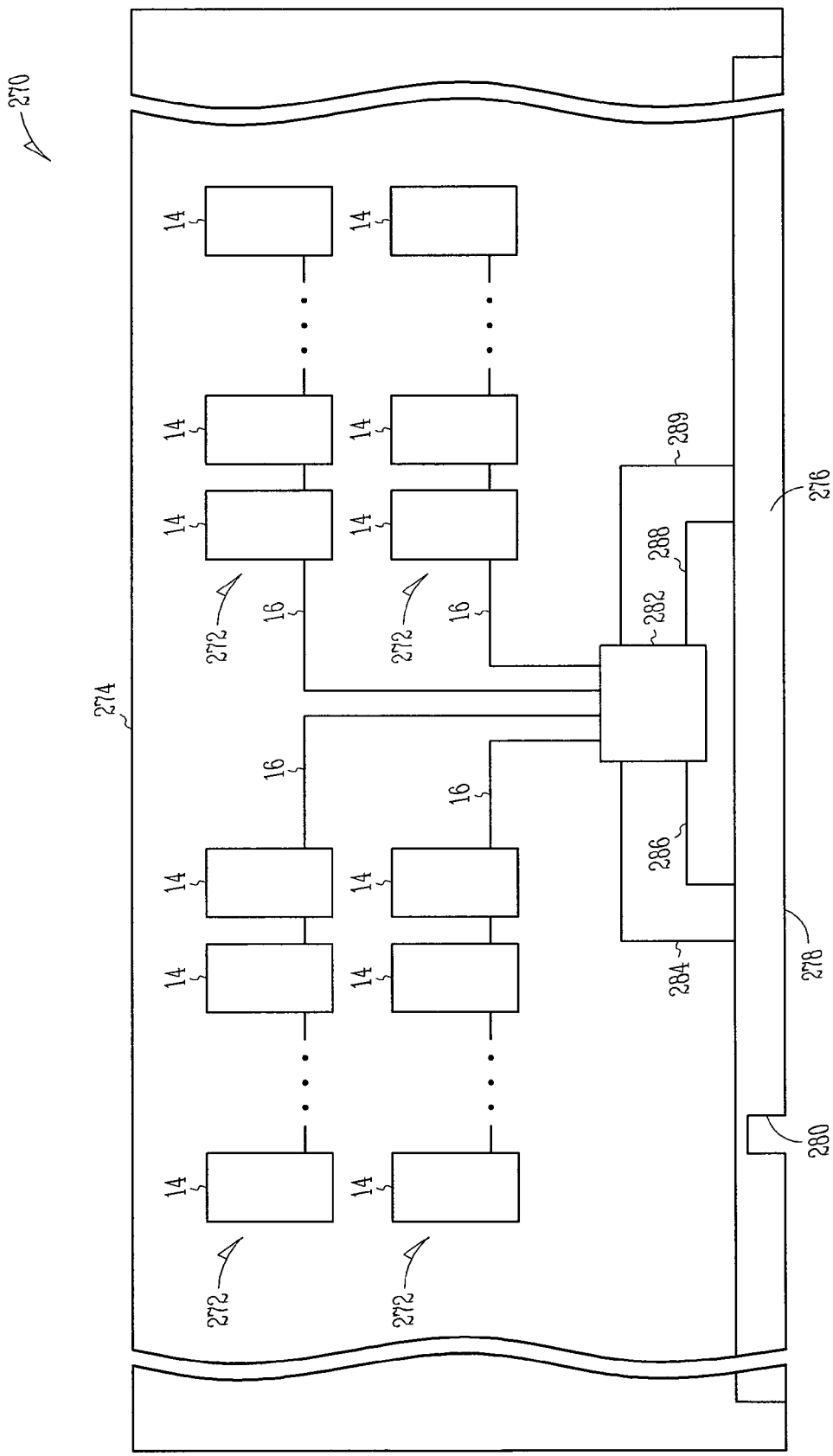
FIG. 12 is a diagrammatic block view of a memory module, according to various embodiments.

FIG. 12 is a partial schematic view of a memory module 270 according to various embodiments. The memory module 270 includes at least one group 272 of memory cubes 14 positioned on a substrate 274 having a front side and an opposing back side that may include conductive traces that electrically couple components positioned on the substrate 274 to an edge connector 276 positioned along a selected edge 278 of the substrate 274. The one or more communications paths 16 associated with the groups 272 may be disposed on the front side and/or the rear side of the substrate 274. In addition, the communications links 16 may also be disposed in discrete layers within the substrate 274. The memory cubes 14 of the at least one group 272 may also be disposed on the front side and/or the rear side of the substrate 274. The edge connector 276 may include spaced-apart electrical conductors (not shown in FIG. 12) that are configured to engage mating contacts in an edge connector slot (also not shown in FIG. 12) so that the module 270 may communicate with circuits and devices external to the module 270. The edge connector 276 may be disposed on the front side and/or the rear side of the substrate 274 and may also include one or more key slots 280 to permit proper alignment of the module 270 in an edge connector slot. In the various embodiments, other additional components may be mounted on the substrate 274 with the components shown in FIG. 12. For example, a driving processor, as well as other components may be mounted on the substrate 274.

The memory module 270 may also include a path manager 282 that may be operably coupled to the at least one group 272. Accordingly, the communications paths 16 comprise local paths (coupled to the communications paths 16) that extend to the at least one group 272, while global source paths 284 and 286 may be coupled to a source (e.g., the source 12 of FIG. 1), and global pass-on paths 288 and 289 may be coupled to still others of the module 270, in order to pass memory signals to the other modules. Although the path manager 282 is shown in FIG. 12 as positioned on the substrate 274, the path manager 282 may be positioned in other locations remote from the substrate 274, and operably coupled to the groups 272.

Figure 13:
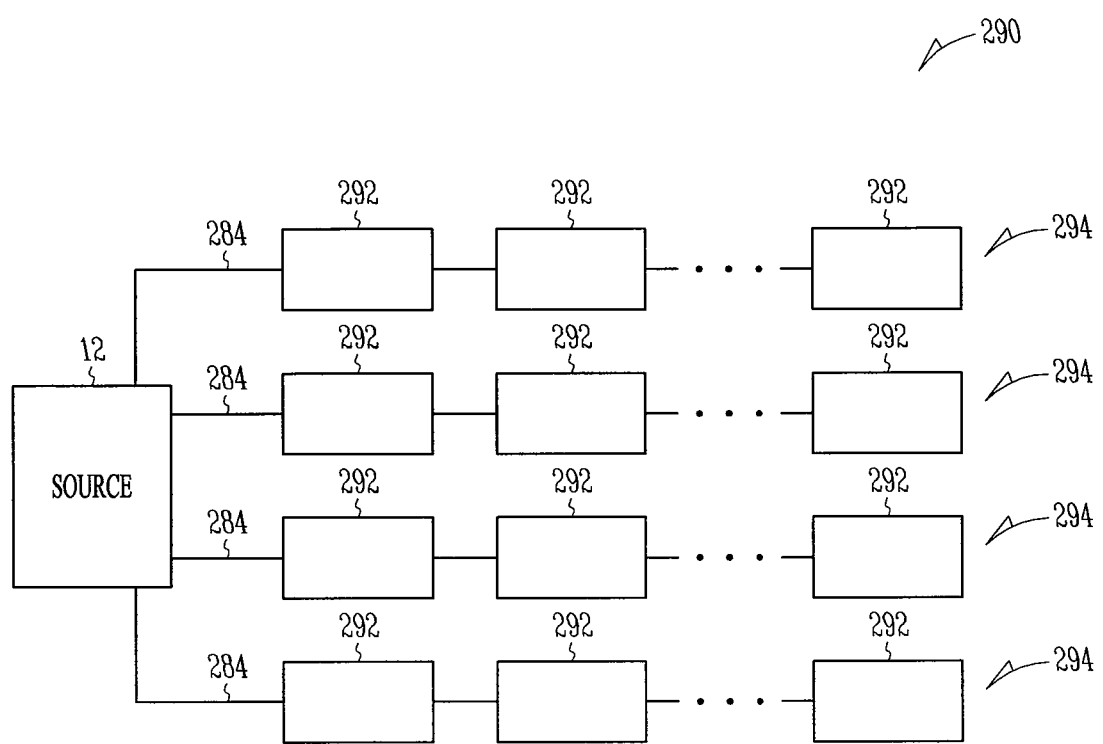
FIG. 13 is a diagrammatic block view of a memory structure, according to various embodiments.

The foregoing memory module 270 may be integrated into still other and more expansive memory structures. With reference now also to FIG. 13, a diagrammatic block view of a memory structure 290 according to various embodiments is shown. The memory structure 290 includes at least one group 294 of memory modules 292, such as, for example, the memory modules 270 of FIG. 12, which may be coupled to the source 12 through communications links 284. Since each of the memory modules 292 may include a path manager, as previously described, the source 12 may communicate with a plurality of the memory devices (e.g., the memory cubes 14 of FIG. 1). In various embodiments, at least some of the memory modules 292 may include 32 or more memory cubes. In other embodiments, at least some of the memory modules may include up to 36 memory cubes, although other larger numbers of memory cubes may also be present. Although the memory structure 290 is shown in FIG. 13 as an assembly of the memory modules 292 that may be disposed on separate substrates, the various embodiments are not so limited. For example, the memory structure 290 shown in FIG. 13 may be disposed on a single substrate, or may be disposed on a substrate having still other components positioned on the substrate.

Figure 14:
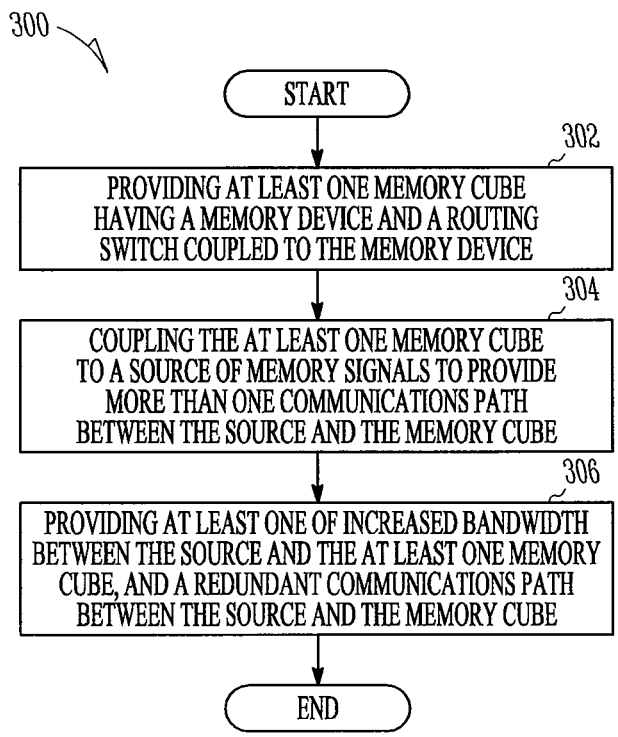
FIG. 14 is a flowchart that describes a method of operating a memory system, according to various embodiments.

FIG. 14 is a flowchart that describes a method 300 of operating a memory system, according to various embodiments. At block 302, the method 300 provides at least one memory cube that includes a memory device that is coupled to a memory device through a plurality of local communications paths. At block 304, the at least one memory cube is coupled to a source of memory signals to provide more than one communications path between the source and the at least one memory cube. According to the various embodiments, the communications paths extending between the source and the at least one memory cube may range between two and four, although other configurations are possible. At block 306, at least one of increased bandwidth between the source and the at least one memory cube, and a redundant communications path between the source and the at least one memory cube is established.

Figure 15:
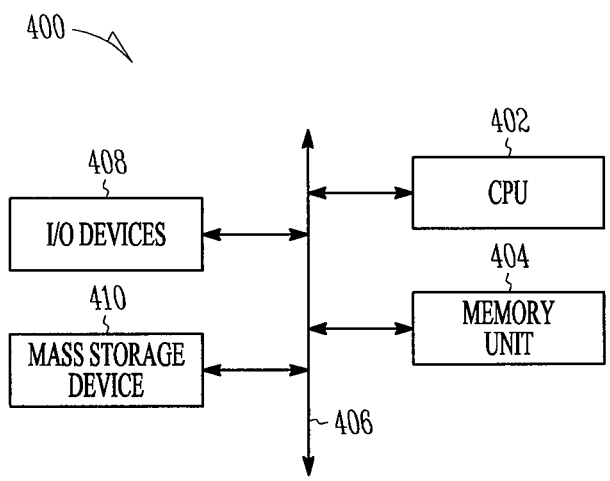
FIG. 15 is a diagrammatic block view of a processing system according to various embodiments.

FIG. 15 is a diagrammatic block view of a processing system 400 according to various embodiments. The processing system 400 may include a central processing unit (CPU) 402, which may include any digital device capable of receiving data and programmed instructions, and processing the data according to the programmed instructions. Accordingly, the CPU 402 may include a microprocessor, such as a general purpose single-chip or multi-chip microprocessor, or it may include a digital signal processing unit, or other similar programmable processing units. The CPU 402 is generally configured to communicate with a memory unit 404 over a suitable communications bus 406. The memory unit 404 may include one or more of the memory cubes structured in accordance with the various embodiments, such as, for example, the memory systems 10, 30 and 40, as shown in FIGS. 1 through 3, respectively. The processing system 400 may also include various other devices that are operably coupled to the bus 406, which are configured to cooperatively interact with the CPU 402 and the memory unit 404. For example, the processing system 400 may include one or more input/output (I/O) devices 408, such as a printer, a display device, a keyboard, a mouse, or other known input/output devices. The processing system 400 may also include a mass storage device 410, which may include a hard disk drive, a floppy disk drive, an optical disk device (CD-ROM), or other similar devices. It is understood that FIG. 15 provides a simplified representation of the processing system 400. Accordingly, it is understood that other devices not shown in FIG. 15, but known in the art (such as, for example, a memory controller) may nevertheless be present in the processing system 400. As the various figures have shown, there may be multiple local paths and global paths in a memory system. It is also within the scope of the various embodiments to provide a memory system that may be coupled to still other memory systems through multiple busses 406.

While various embodiments have been illustrated and described, as noted above, changes can be made without departing from the disclosure. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom. This Detailed Description, therefore, is not to be taken in a limiting sense.

Although specific embodiments have been illustrated and described herein, it should be appreciated that any arrangement calculated to achieve the same purpose may be substituted for the specific embodiments shown. Furthermore, although the various embodiments have been described with reference to memory systems and devices, it is understood that the various embodiments may be employed in a variety of known electronic systems and devices without modification. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the meaning of the claims. In addition, in the foregoing Detailed Description, it can be seen that various features may be grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A memory system, comprising:
   a first group of serially-coupled memory cubes and a second group of serially-coupled memory cubes that are coupled in parallel to a source in operation; and
   a bidirectional communications path that is configured to communicatively couple each of the first group of serially-coupled memory cubes and the second group of serially-coupled memory cubes to the source, wherein an output of each memory cube except for the last memory cube of the first group of serially-coupled memory cubes is directly coupled to an input of a memory cube of the second group of serially-coupled memory cubes, and wherein the first group of serially-coupled memory cubes and the second group of serially-coupled memory cubes are coupled in an intertwined manner to provide redundant communication paths.

2. The memory system of claim 1, wherein the first group of serially-coupled memory cubes includes a first portion of a plurality of memory devices, and wherein the second group of serially-coupled memory cubes includes a second portion of the plurality of memory devices.

3. The memory system of claim 1, wherein each memory cube of the first group of serially-coupled memory cubes includes only one first memory device and only one first routing switch, and wherein each of the first portion of the memory devices is coupled to the first routing switch operably coupled to the source.

4. The memory system of claim 1, wherein each memory cube of the second group of serially-coupled memory cubes includes only one second memory device and only one second routing switch, and wherein each of the second portion of the memory devices is coupled to the second routing switch operably coupled to the source.

5. The memory system of claim 1, wherein each of the first group and the second group comprises multiple memory cubes.

6. The memory system of claim 1, wherein the bidirectional communications path comprises a plurality of full-duplex bidirectional lanes extending in each direction.

7. A memory system, comprising:
a first group of serially-coupled memory cubes including a first portion of a plurality of memory devices;
a second group of serially-coupled memory cubes including a second portion of the plurality of memory devices, the second group of serially-coupled memory cubes being in parallel to the first group of serially-coupled memory cubes; and
a communications link including a first pair of bidirectional communications paths coupled to the first group and a second pair of bidirectional communications paths coupled to the second group, the communications link coupling each of the first group and the second group to a source, wherein an output of each memory cube except for the last memory cube of the first group of serially-coupled memory cubes is directly coupled to an input of a memory cube of the second group of serially-coupled memory cubes, and wherein the first group of serially-coupled memory cubes and the second group of serially-coupled memory cubes are coupled in an intertwined manner to provide redundant communication paths.

8. The memory system of claim 7, wherein each memory cube of the first group of serially-coupled memory cubes includes only one first memory device and only one first routing switch, and wherein each of the first portion of the memory devices are coupled to the first routing switch and configured to be coupled to the source.

9. The memory system of claim 7, wherein each memory cube of the second group of serially-coupled memory cubes includes only one second memory device and only one second routing switch, and wherein each of the second portion of the memory devices is coupled to the second routing switch configured to be coupled to the source.

10. The memory system of claim 7, wherein a particular one of the first pair of the bidirectional communications paths is coupled to a particular memory cube in the second group, and wherein a particular one of the second pair of the bidirectional communications paths is coupled to a particular memory cube in the first group.

11. A memory system, comprising:
a first plurality of memory cubes serially coupled to a source by a first pair of bidirectional communications paths; and
a second plurality of memory cubes serially coupled to the source by a second pair of bidirectional communications paths, wherein an output of each memory cube except for the last memory cube of the first plurality of memory cubes is directly coupled to an input of a memory cube of the second plurality of memory cubes, and wherein the first group of serially-coupled memory cubes and the second group of serially-coupled memory cubes are coupled in an intertwined manner to provide redundant communication paths.

12. The memory system of claim 11, wherein each of the first plurality of memory cubes includes only one memory device and only one routing switch communicatively coupled to the memory device by a plurality of local communications paths, and wherein the routing switch includes bidirectional input/output (I/O) ports configured to communicate data between the source and the first plurality of memory cubes.

13. The memory system of claim 12, wherein the bidirectional input/output (I/O) ports comprise an input block configured to receive packetized data, a multiplexer configured to transmit the packetized data, and a cross point switching network configured to communicate the packetized data to the memory device.

14. The memory system of claim 13, wherein the input block comprises error correcting code (ECC) circuitry configured to detect and correct errors in received data.

15. A memory module, comprising:
a substrate configured to be coupled to a source of memory signals; and
a first group of serially-coupled memory cubes coupled to the source by a communications link, wherein an output of each memory cube except for the last memory cube of the first group of serially-coupled memory cubes is directly coupled to an input of a memory cube of a second group of serially-coupled memory cubes, wherein the second group of serially-coupled memory cubes is coupled to the source in parallel to the first group of serially-coupled memory cubes, and wherein the first group of serially-coupled memory cubes and the second group of serially-coupled memory cubes are coupled in an intertwined manner to provide redundant communication paths.

16. The memory module of claim 15, wherein each memory cube of the first group of serially-coupled memory cubes includes only one memory device and only one routing switch coupled to the memory device.

17. The memory module of claim 16, wherein the communications link is configured to couple routing switches of the first group of serially-coupled memory cubes to the source.

18. The memory module of claim 15, wherein the bidirectional communications link extends to an edge connector disposed on the substrate and configured to couple to the source.

19. The memory module of claim 15, wherein the first group of serially-coupled memory cubes comprises a plurality of memory cubes, and wherein the bidirectional communications link each includes a plurality of data lanes.

20. A memory system, comprising:
a first group of serially-coupled memory cubes disposed on a substrate, wherein each memory cube of the first group of serially-coupled memory cubes includes only one memory device and only one routing switch coupled to the memory device, wherein an output of each memory cube except for the last memory cube of the first group of serially-coupled memory cubes is directly coupled to an input of a memory cube of a second group of serially-coupled memory cubes, and wherein the first group of serially-coupled memory cubes and the second group of serially-coupled memory cubes are coupled in an intertwined manner to provide redundant communication paths.

21. The memory system of claim 20, further comprising:
a path manager configured to be operably coupled to a source of memory signals and operable to communicate the memory signals to the routing switch of the first group through a local communications link.

22. The memory system of claim 21, wherein the local communications link comprises a pair of bidirectional communications paths coupled to the routing switches of the first group of serially-coupled memory cubes.

23. The memory system of claim 21, wherein the path manager is coupled to the source by a pair of bidirectional global source paths.

* * * * *